(12) United States Patent
Raju et al.

(10) Patent No.: US 9,794,251 B2
(45) Date of Patent: Oct. 17, 2017

(54) SYSTEMS AND METHODS FOR AUTHENTICATING USING AIR-BLOW BY USER

(71) Applicant: Wipro Limited, Bangalore (IN)

(72) Inventors: Bittu Aby Raju, Kottayam (IN); Midhun Mohan, Kottayam (IN); Vinutha Bangalore Narayanmurthy, Bangalore (IN); Manoj Madhusudhanan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 28 days.

(21) Appl. No.: 14/826,236

(22) Filed: Aug. 14, 2015

(65) Prior Publication Data

US 2016/0380994 A1    Dec. 29, 2016

(30) Foreign Application Priority Data

Jun. 25, 2015 (IN) .......................... 3201/CHE/2015

(51) Int. Cl.
*H04L 29/06* (2006.01)
*G06F 21/32* (2013.01)

(52) U.S. Cl.
CPC ............ *H04L 63/083* (2013.01); *G06F 21/32* (2013.01)

(58) Field of Classification Search
CPC .. H04L 63/0861; H04L 63/3247; G06F 21/31
See application file for complete search history.

(56) References Cited

U.S. PATENT DOCUMENTS

| | | | |
|---|---|---|---|
| 6,594,632 B1 | 7/2003 | White | |
| 6,728,395 B1* | 4/2004 | Kage | ...................... G06F 1/1626 345/157 |
| 8,082,448 B2 | 12/2011 | Vandervort | |
| 8,095,081 B2* | 1/2012 | Vance | ...................... H04B 1/46 379/431 |
| 2014/0129231 A1 | 5/2014 | Herring et al. | |

* cited by examiner

*Primary Examiner* — Dao Ho
(74) *Attorney, Agent, or Firm* — Finnegan, Henderson, Farabow, Garrett & Dunner LLP

(57) ABSTRACT

The disclosure related generally to systems and methods for authenticating using air-blow by user. At least one input device receives one or more air-blows associated with one or more blow speeds. A pointer on a user interface is caused to move to at least one numeric character on at least one scale in response to each of the one or more blow speeds. The at least one numeric character is compared with a predetermined personal identification number (PIN) mapped to the at least one user. The user is granted access or access is denied based on the comparing.

12 Claims, 4 Drawing Sheets

SYSTEMS AND METHODS FOR AUTHENTICATING USING AIR-BLOW BY USER

PRIORITY CLAIM

This U.S. patent application claims priority under 35 U.S.C. §119 to India Application No. 3201/CHE/2015, filed Jun. 25, 2015. The entire contents of the aforementioned application are incorporated herein by reference.

TECHNICAL FIELD

This disclosure relates generally to authentication of a user, and more particularly to systems and methods for authenticating using Air-Blow by user.

BACKGROUND

In many current interaction scenarios (for example banking), users have to enter their unique personal identification number (PIN) through a keyboard/virtual keyboard. The security of such systems is at risk since a fraudster peeping from behind will be able to track the PIN while it is entered via the keyboard. In this busy world, people may not be always vigilant enough to check if someone else is tracking them.

Many solutions have been proposed to overcome the above problem. One of the solution is to hide the keyboard based entries so that they are not visible to unauthorized third parties. However, the keyboard based strokes are visible and can be tracked and reused by an unauthorized third party. It becomes difficult to hide or camouflage PIN entry in real life use scenarios.

The other solution can be to enter the PIN without keyboard. There exists voice based authentication systems. User is required to read out a text and a system recognizes the person based on users sound characteristics which are already registered in the system. However, the sound patterns of a person can be mimicked by experts who can be utilized in an unauthorized manner.

Further, there are other biometric identification techniques such as finger prints and iris signature of the user. However, they require complex and costly hardware.

Therefore, in view of the above problems, there exists a need for systems and methods that can allow the user to enter his PIN without using a keyboard/voice based authentication and NOT allowing any third party to gain access to PIN information of the user for unauthorized access.

SUMMARY

Disclosed herein is an air-blow based method of authentication of at least one user. The method includes receiving, using at least one input device, one or more air-blows associated with one or more blow speeds; causing a pointer on a user interface to move to at least one numeric character on at least one scale in response to each of the one or more blow speeds; comparing the at least one numeric character with a predetermined personal identification number (PIN) mapped to the at least one user; and authenticating the at least one user based on the comparing.

In an aspect of the invention, a system for air-blow based authentication of at least one user is disclosed. The system includes at least one input device to receive one or more air-blows associated with one or more blow speeds; an user interface having a pointer wherein the pointer is caused to move to at least one numeric character on at least one scale in response to each of the one or more blow speeds. Further, the system may include one or more hardware processors and a memory storing instructions that, when executed by the one or more hardware processors, causes the one or more hardware processors to perform operations. The operations may include comparing the at least one numeric character with a predetermined personal identification number (PIN) mapped to the at least one user; and authenticating the at least one user based on the comparing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
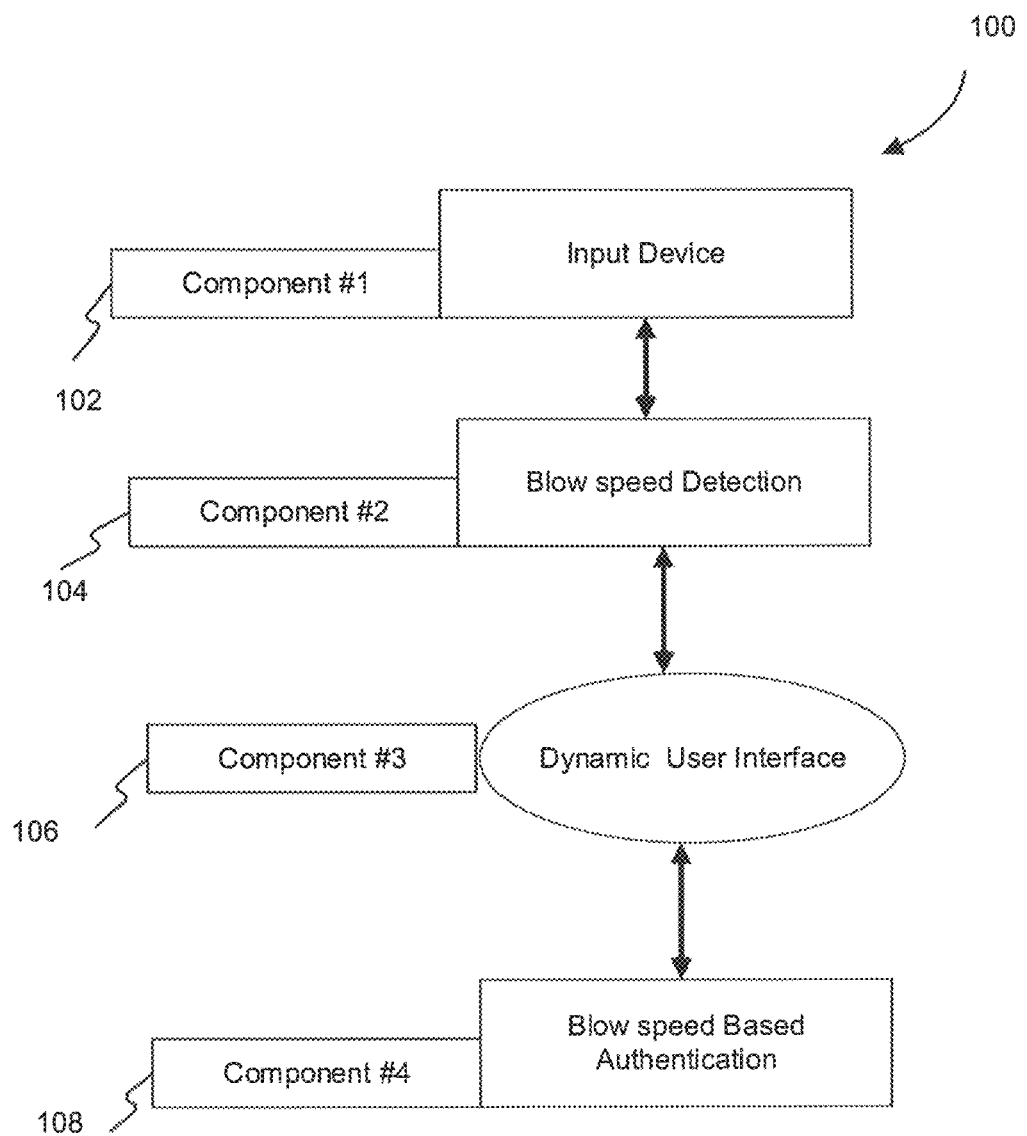
FIG. 1 illustrates diagram of an exemplary system for authenticating the user using air-blow in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the present disclosure, the word "exemplary" used herein to mean "serving as an example, instance, or illustration." Any embodiment or implementation of the present disclosure described herein as "exemplary" is not necessarily to be construed as preferred or advantageous over other embodiments.

While the present disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure discloses methods and systems for authenticating using air-blow by user for improved security of PIN entry process. Blowing air through mouth is a relatively easy task for any person to perform. The blowing air sound made by a person can be altered in a plurality of speeds that are difficult to copy by just observation. The systems and methods detects "Air blow speed" of a person into a input device based on sound waves generated for entering secure passwords. The input device may be a microphone. The air blow pattern can be used as a unique password for secure entries or PINs.

An air blow authentication PIN can have a combination of blow speeds. Instead of using keyboard for entering PIN it will use a microphone. User has to blow air to activate a scale that detects different range of air blow speeds. The user has to remember his PIN and blow air accordingly on the corresponding scale.

Further, for security each user will be allocated a color band. The user interface for authentication will have the color bands indication. The numbers on the scale are generated randomly each time the authentication happens. The pointer on the scale may be moved based on the strength of the air blow.

FIG. 1 illustrates diagram of an exemplary system 100 for authenticating the user using air-blow in accordance with some embodiments of the present disclosure. The system 100 comprises a plurality of components, for example component #1 102, component #2 104, and component #3 106, and component #4 108. The component #1 102 may be a microphone. The microphone may be attached to a computing device (not shown). In an exemplary embodiment, the microphone may be integrated part of the computing device. The computing device may be auto teller machine (ATM). The microphone captures the sound associated with the blow of air by the user as an input.

The component #2 104 detects whether a user is blowing air into the microphone. Blow sounds are made up of low frequency signals. Therefore, a low pass filter is used which cuts the high frequency components of the sound associated with the air-blow by the user. A minimum threshold is set to low frequency components to detect a blowing sound.

Figure 2:
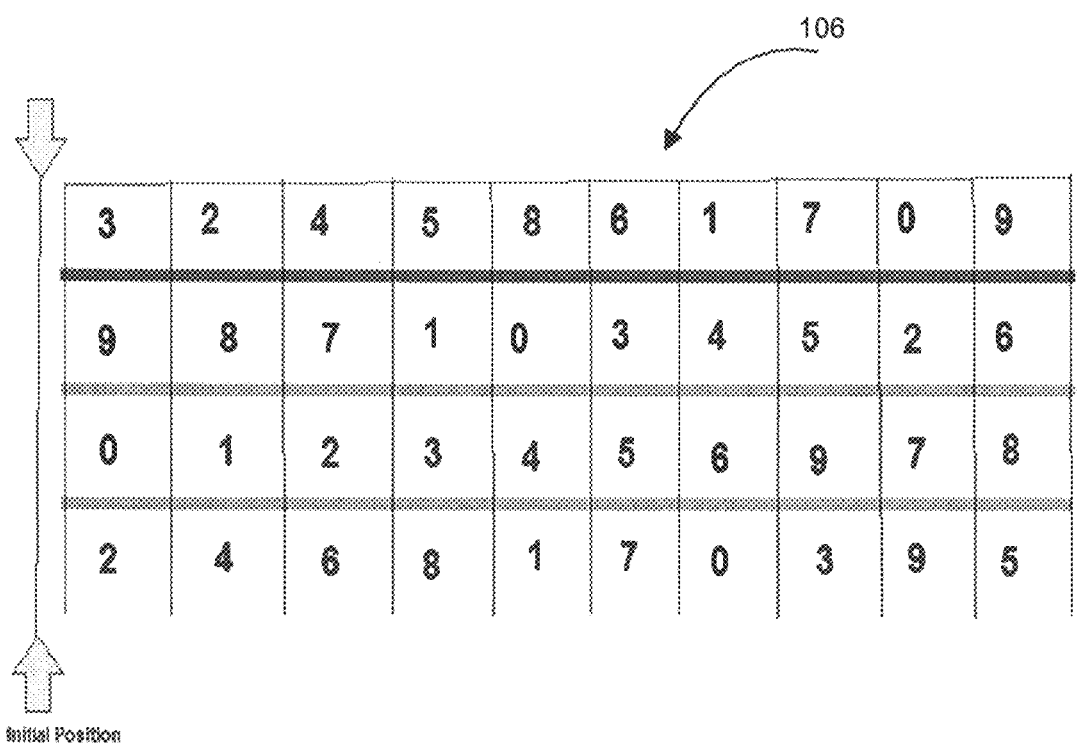
FIG. 2 illustrates a dynamic user interface in accordance with the principles of the present invention with some embodiments of the present disclosure.

The component #3 106 is a dynamic user interface. In an exemplary embodiment, in the automated teller machine (ATM), the present disclosure may replace the user interface of a conventional ATM with a user interface in accordance with the principles of the present disclosure. Rest of the components like reset, cancel, and enter buttons remain intact. FIG. 2 illustrates a dynamic user interface 106 in accordance with the principles of the present invention. The dynamic user interface 106 comprises a plurality of rows and columns. The rows and columns intersect each other to form cells. Each of the cells comprise a numeric character.

The numeric character ranges from 0 to 9. Each of the plurality of rows comprises a plurality of numeric characters ranging from 0 to 9, wherein the position of each of the numeric characters keeps changing randomly. The position of each of the numeric characters keeps changing randomly with the start of each transaction. The plurality of rows correspond to plurality of scales 210-1, 210-2, . . . 210-n. (collectively referred to as 210). The scale may act as a color band assigned to a particular user. Increase in the number of color bands increases the security of the authentication of a user.

Further, each of the plurality of columns corresponds to a particular blow speed like blow speed 1, blow speed 2, blow 3, . . . blow speed n. The number of columns may be 10. Consequently, there may be 10 types of blow speeds.

Further, there is a pointer 220 resting at the initial position. The pointer 210 moves in response to the blow sound which is detected by the scale 210. Whether the pointer moves to blow speed 1, blow speed 2 . . . blow speed n depends on the strength of the blow. For example, the user needs to enter PIN 5670. The user blows in the microphone 102 so as to move the pointer 220 to the numeric character 5. The numeric character 5 is registered. The strength of the air-blow by the user corresponds to blow speed 4. Similarly, for causing the pointer 220 to move to the numeric character 6, the user has to blow with a strength corresponding to the blow speed 6. For entering the next numeric character, the user has to press reset button so that the pointer 220 moves to the initial position. Each user may be assigned a particular color band corresponding to a particular scale 210. So the user has to blow on his scale to more the pointer to move to a particular number. In this way, the user enters the PIN. The user interface 106 is dynamic as the position of each of the plurality of numeric characters changes randomly. So, the blow speed may correspond to different numeric character in different transaction. Within the processing of a transaction, the position of each of the plurality of numeric characters remains constant.

Furthermore, the component #4 108 may be used for blow based speed authentication. Based on the blow speed input and the color band already mapped to the user, PIN is entered which is compared with a predefined PIN stored in a database for authenticating the user.

Figure 3:
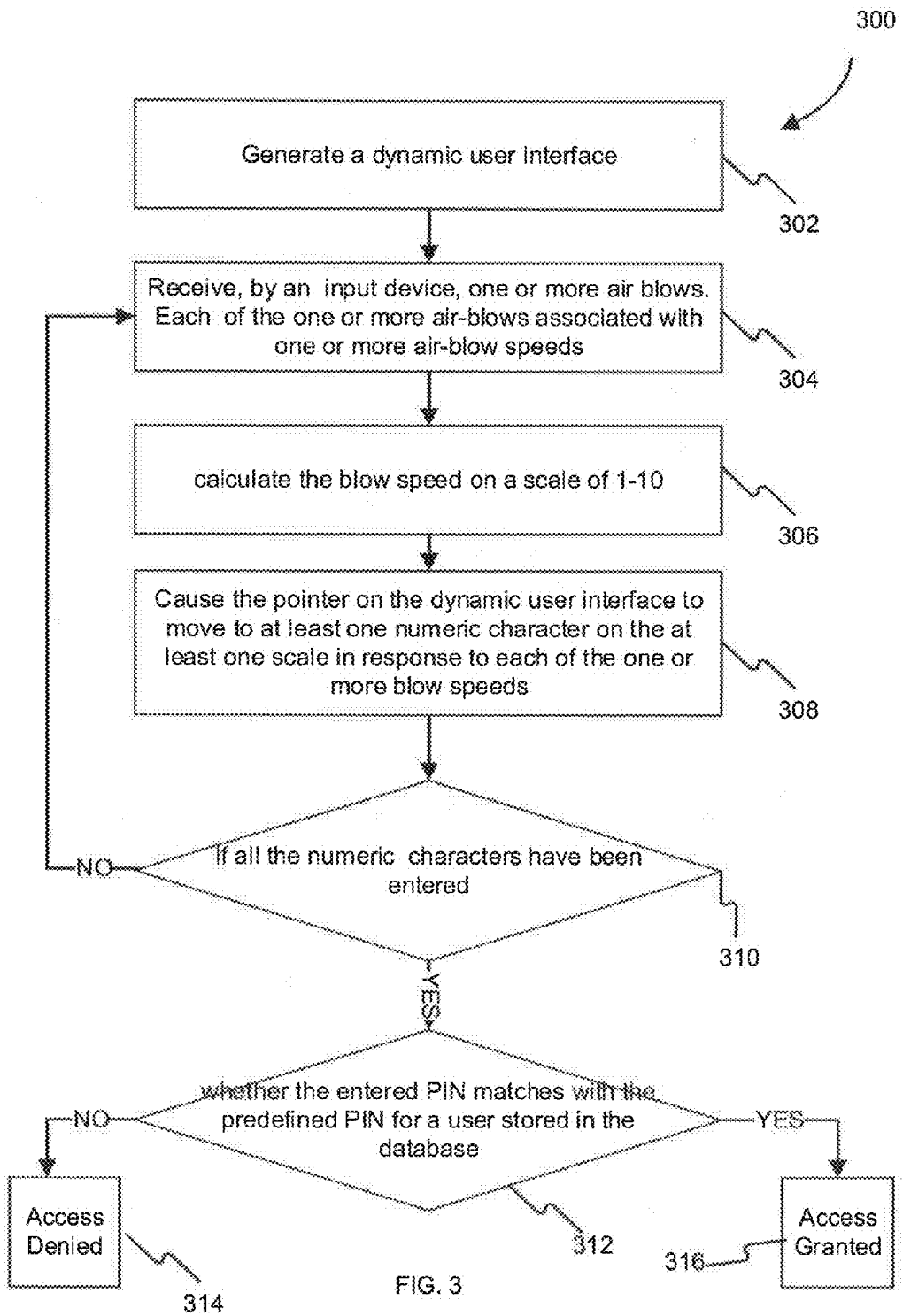
FIG. 3 is a flowchart of an exemplary method of using air-blow for authentication of the user in accordance with some embodiments of the present disclosure.

FIG. 3 is a flowchart 300 of an exemplary method of using air-blow for authentication of the user in accordance with some embodiments of the present disclosure. This is explained in conjunction with FIGS. 1-2.

At step 302, a dynamic user interface 106, as explained above with reference to FIG. 2, is generated.

At step 304, an input device 102 receives one or more air-blows. The input device 102 may be a microphone. Each of the one or more air-blows is associated one or more blow speeds. The blow speed is indicative of the strength of one or more air-blows. The user blows air into the microphone. Air-blow is directed by the user towards at least one scale on the dynamic user interface 106.

At step 306, calculate the blow speed on a scale of 1-10. Sound signal generated from the microphone is passed through a low pass filter and checks the signal produced by the user is a blow type sound. Once a low frequency blow sound is found, based on the low frequency strength, the blow speed value is calculated on a scale of 1-10. Ten frequency ranges are specified for different blow speeds.

At step 308, the pointer 210 on the dynamic user interface 106 is caused to move to at least one numeric character on the at least one scale in response to each of the one or more blow speeds. The at least one numeric character ranges from 0 to 9. The position of each of the at least one numeric character on the at least one scale changes randomly every time the at least one user starts a new transaction. As noted above, the at least one scale comprises one or more color bands. Each of the color bands is assigned to a particular user. Increase in the number of color bands improves the security of the PIN entry access. After a particular numeric character referenced by the pointer 210 is registered, the pointer 210 moves to the initial position.

At step 310, it is checked if all the numeric characters have been entered. If NO, the flow goes to step 304. If YES, the flow goes to step 312. The entered numeric characters constitute a PIN.

At step 312, it is checked whether the entered PIN matches with the predefined PIN for a user stored in the database. If there is a match, access is granted (step 314). If there is no match, access is denied (step 316).

Computer System

Figure 4:
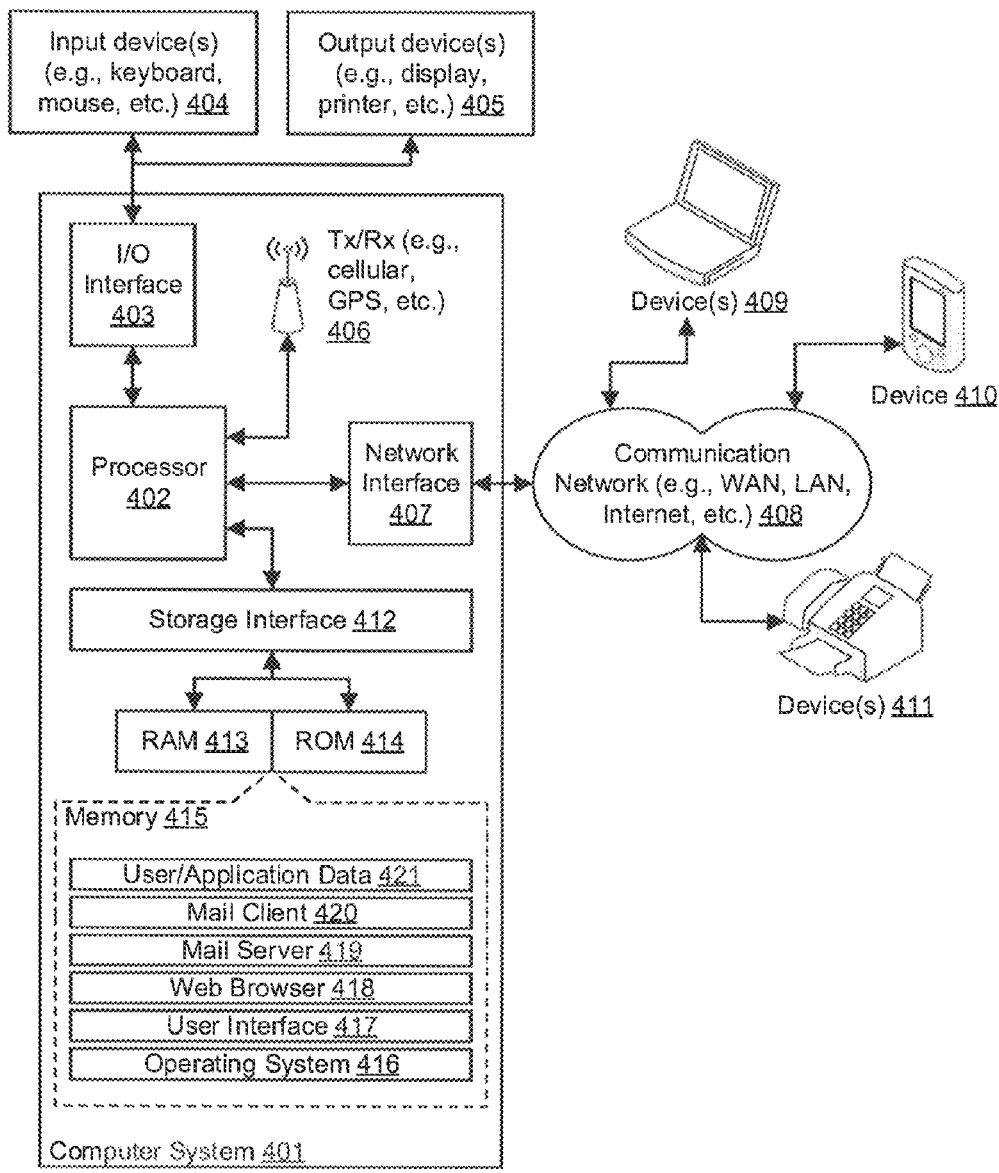
FIG. 4 is a block diagram of an exemplary computer system for implementing embodiments consistent with the present disclosure.

FIG. 4 is a block diagram of an exemplary computer system 401 for implementing embodiments consistent with the present disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural RCA, stereo, IEEE-1394, serial bus universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The one or more memory devices may be used for implementing variations of the database 410. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives May further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., energy consumption associated with an energy asset 122, filtered output, clusters) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for authenticating using air-blow by user. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An air-blow based method of authentication of at least one user, the method comprising:
   receiving, using at least one input device, air-blows associated with one or more blow speeds;
   causing, in response to a first blow speed of the one or more blow speeds, a pointer to move over a first distance on at least one scale to reach a first numeric character of numeric characters on the least one scale, wherein the first distance corresponds to the at least one user,
   wherein a plurality of numeric characters on the at least one scale are registered in response to multiple air-blows;
   comparing the plurality of registered numeric characters with a plurality of predetermined personal identification numbers (PIN) mapped to the at least one user; and
   authenticating the at least one user based on the comparing,
   wherein the numeric characters on the at least one scale range from 0 to 9, and
   wherein a position of each of at least one of the numeric characters on the at least one scale changes randomly every time a new transaction is started by the at least one user.

2. The air-blow based method of claim 1, wherein the plurality of numeric characters comprise a sequence of two or more numeric characters.

3. The air-blow based method of claim 2, wherein comparing the plurality of numeric characters with a plurality of predetermined personal identification numbers (PIN) mapped to at least one user comprises: comparing the sequence of the two or more characters with the predetermined PIN.

4. The air-blow based method of claim 1, wherein the at least one scale comprises one or more color hands, each of the one or more color hands mapped to corresponding at least one user.

5. The air-blow based method of claim 1, wherein the pointer returns to the initial position after at least one numeric character of the plurality of numeric characters is registered.

6. The method of claim 1, further comprising:
   determining sound signals associated with the received one or more air-blows;
   determining strengths of the sound signals; and
   determining the one or more blow speeds associated with the received one or more air-blows based on the strengths.

7. A system for air-blow based authentication of at least one user, the system comprising:

at least one input device to receive air-blows associated with one or more blow speeds;

an user interface to display a pointer;

one or more hardware processors;

a memory storing instructions that when executed by the one or more hardware processors, causes the one or more hardware processors to perform operations comprising:

causing, in response to a first blow speed of the one or more blow speeds, the pointer to move over a first distance on at least one scale to reach a first numeric character of numeric characters on the least one scale, wherein the first distance corresponds to the at least one user, wherein a plurality of numeric characters on the at least one scale are registered in response to multiple air-blows;

comparing the plurality of registered numeric characters with a plurality of predetermined personal identification numbers (PIN) mapped to the at least one user; and authenticating the at least one user based on the comparing, wherein the numeric characters on the at least one scale range from 0 to 9, and wherein a position of each of at least one of the numeric characters on the at least one scale changes randomly every time a new transaction is started by the at least one user.

8. The system of claim 7, wherein the plurality of numeric characters comprise a sequence of two or more numeric characters.

9. The system of claim 8, wherein comparing the plurality of numeric characters with a plurality of predetermined personal identification numbers (PIN) mapped to at least one user comprises:

comparing the sequence of the two or more characters with the predetermined PIN.

10. The system of claim 7, wherein the at least one scale comprises one or more color bands, each of the one or more color bands mapped to corresponding at least one user.

11. The system of claim 7, wherein the pointer returns to the initial position after at least one numeric character of the plurality of numeric characters is registered.

12. The system of claim 7, wherein the operation further comprises:

determining sound signals associated with the received one or more air-blows;

determining strengths of the sound signals; and determining the one or more blow speeds associated with the received one or more air-blows based on the strengths.

* * * * *